Sept. 20, 1971     W. D. FOSTER     3,605,457
TRAILER HITCH LOCK
Filed April 23, 1970     3 Sheets-Sheet 1
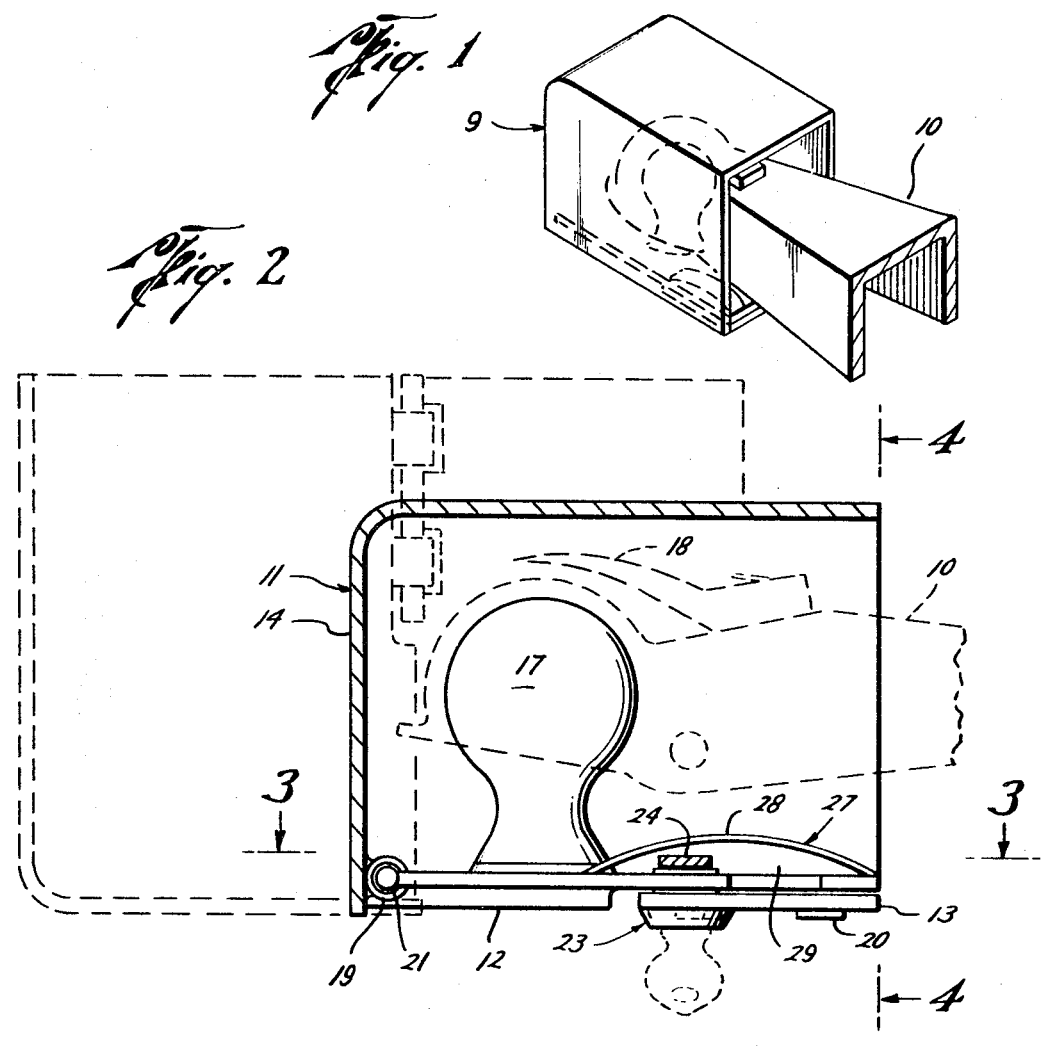
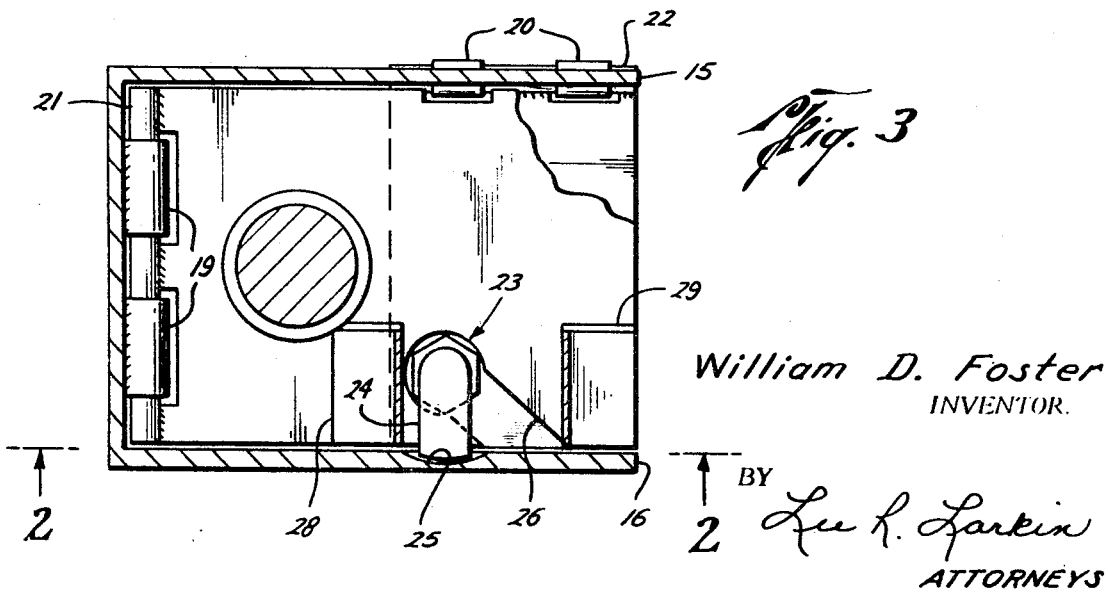
William D. Foster
INVENTOR.
BY Lee R. Larkin
ATTORNEYS

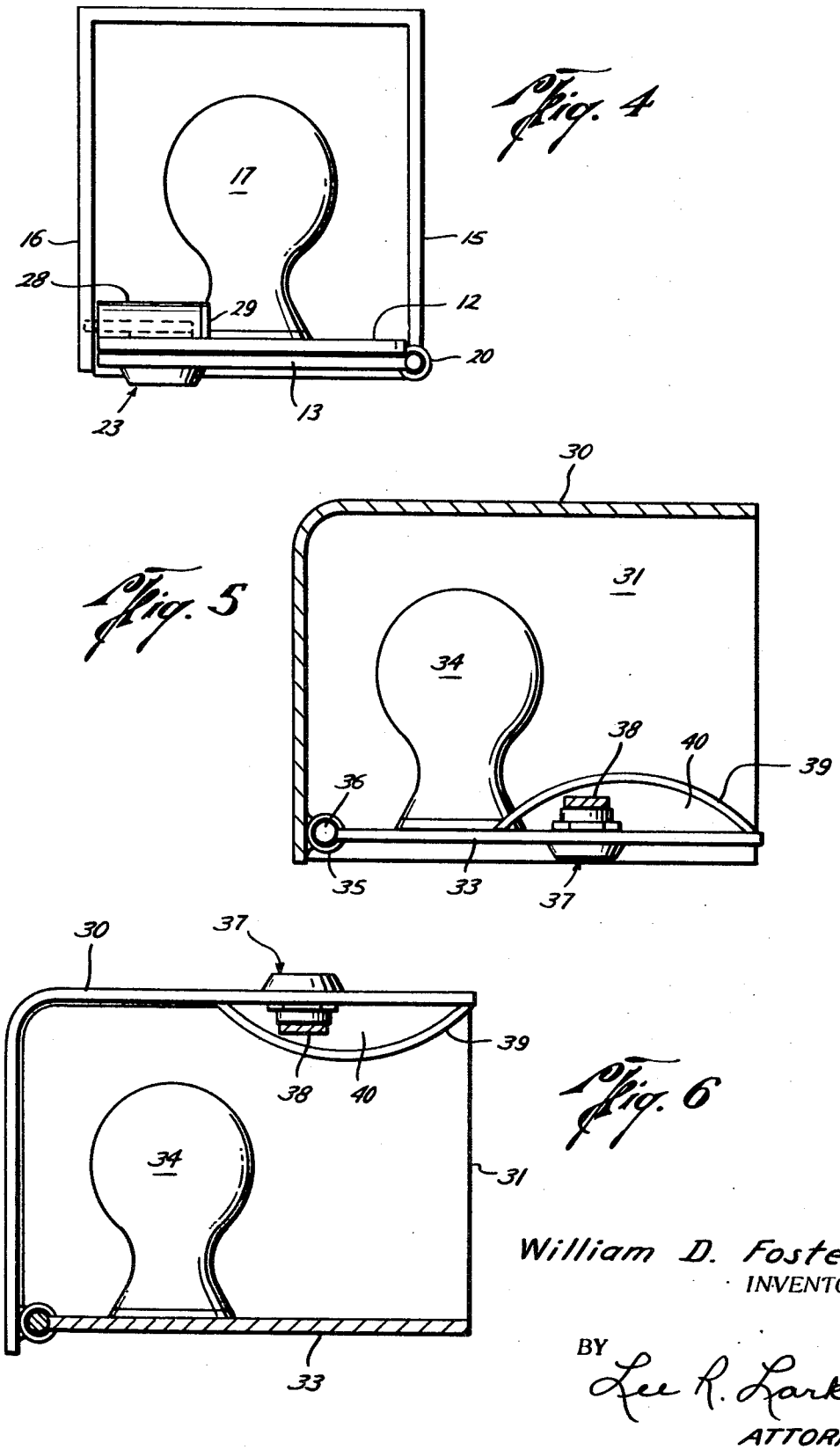

Sept. 20, 1971  W. D. FOSTER  3,605,457
TRAILER HITCH LOCK

Filed April 23, 1970  3 Sheets-Sheet 3

William D. Foster
INVENTOR.

BY Lee R. Larkin
ATTORNEYS

United States Patent Office 3,605,457
Patented Sept. 20, 1971

3,605,457
TRAILER HITCH LOCK
William D. Foster, 1414 Pirate's Cove,
Houston, Tex. 77058
Filed Apr. 23, 1970, Ser. No. 31,128
Int. Cl. E05b 73/00
U.S. Cl. 70—14                                10 Claims

ABSTRACT OF THE DISCLOSURE

An apparatus for preventing access to a trailer hitch including an enclosure about the end of the hitch and a substitute towing ball carried on a wall segment of the enclosure for insertion into the ball socket of the hitch. A wall segment of the enclosure is pivotally connected to the enclosure to allow insertion and removal of the substitute ball and a concealed lock is provided to retain the enclosure about the hitch.

BACKGROUND OF THE INVENTION

Field of the invention

This invention relates to apparatus for connection about the end of a trailer hitch to prevent unauthorized connection of a towing ball to the vehicle.

DESCRIPTION OF THE PRIOR ART

Many types of wheeled business and recreational trailers are constructed with an integral trailer hitch and tongue for towing the trailer behind a draft vehicle. It is common practice to leave these trailers unattended and unguarded for long periods of time in areas fairly accessible to the public. As a result, it is becoming increasingly common for unauthorized persons to remove these trailers by simply connecting their towing vehicle to the trailer hitch ball socket and driving off.

Several prior art devices have been offered to prevent trailer theft by preventing the connection of an unauthorized towing vehicle to the ball socket of the trailer. However, these prior art devices are unsatisfactory for various reasons. For example, many prior art hitch locks require the use of a key and a special tool for insertion and removal. Loss of either prevents operation of the lock by authorized persons. Most of the existing devices rely upon simple, exposed hasp-type padlocks to secure the apparatus to the trailer. These may be easily broken or cut, allowing access to the hitch.

SUMMARY OF THE INVENTION

The invention includes a housing arranged to enclose the ball socket and outer portion of a trailer hitch, with a member upstanding from one wall portion within the housing for engaging the hitch ball socket. At least one wall section of the housing is movable to allow selective attachment and removal of the housing from the trailer hitch. A concealed lock is provided for locking the housing about the hitch, the lock being carried either by a movable or by a non-movable wall section. The movable wall section may be pivotally attached to the housing.

BRIEF DESCRIPTION OF THE DRAWINGS

FIG. 1 is a perspective view of one embodiment of the invention.

FIG. 2 is a side elevation view, partially in section, of the FIG. 1 embodiment, showing in dotted lines the apparatus unlocked and open.

FIG. 3 is a sectional view taken along 3—3 of FIG. 2.

FIG. 4 is an end view taken along 4—4 of FIG. 2.

FIG. 5 is a sectional view of a second embodiment of the invention.

FIG. 6 is a sectional view of the second embodiment showing an alternate lock location.

DESCRIPTION OF THE DISCLOSED EMBODIMENTS

Figure 7:
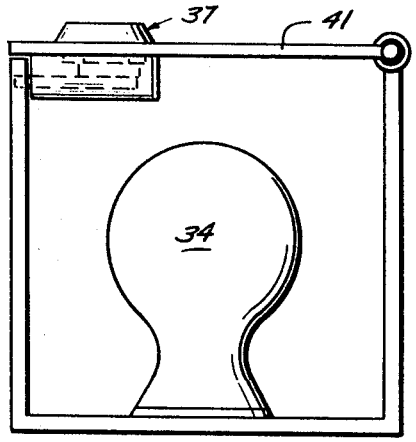
FIG. 7 is an end view of the second embodiment showing alternate hinge and lock locations.

Referring to the drawings, the hitch lock apparatus of this invention is generally shown in perspective in FIG. 1. Detailed illustrations of a first embodiment of the invention are shown in FIGS. 2–4, with an alternate embodiment shown in FIGS. 5–9. In all embodiments of this invention, a housing, generally designated 9 in FIG. 1, is provided for enclosing the outer end portion of a trailer hitch 10. Although illustrated as a generally rectangular open-ended box, housing 9 may be formed in any shape suitable for enclosing hitch 10, and may be arranged for use with any conventional trailer hitch.

Referring to FIGS. 2–4, housing 9 of the first embodiment of this invention includes a housing cover 11 which is enclosed on the bottom by base plate 12 and lock plate 13. Housing cover 11 is formed of an angulated plate 14 with side plates 15 and 16 welded thereto.

A substitute towing ball 17 is carried by base plate 12 and is arranged for insertion into the ball socket 18 of hitch 10. Ball 17 may be constructed as shown or may have any other convenient elongate shape suitable for insertion into socket 18 to retain the apparatus upon hitch 10.

Base plate 12 and lock plate 13 form the bottom wall section of housing 9 and are made movable relative to housing cover 11 to allow the apparatus to be secured to or removed from hitch 10. In the embodiment illustrated in FIGS. 2–4, this movable relationship is provided in the form of integrally constructed hinges, with hinge pin sleeves 19 and 20 welded to cover 11 and matching hinge pins 21 and 22 welded to base plate 12 and lock plate 13, respectively. Cover 11 and lock plate 13 are shown in dotted lines in FIG. 2 in the open position, allowing access to hitch 10 and removal of ball 17. An equally acceptable movable connection between cover 11 and plates 12 and 13 could be provided in the form of blind hinges internally secured to cover 11 and plates 12 and 13 or through the use of a tongue and groove arrangement which would allow plates 12 and 13 to be removed from cover 11 as the apparatus is opened.

Lock plate 13 carries a key operable lock assembly 23 having a projecting lug or bolt 24 arranged to secure the apparatus about hitch 10, as shown in FIGS. 2–4. Lock assembly 23 is positioned on plate 13 to allow the end portion of bolt 24 to engage an arcuate lock recess 25 provided on side plate 16 of cover 11, thereby preventing relative movement between cover 11 and plate 13. In addition, relative movement between plates 12 and 13 is prevented when bolt 24 is in the locked position due to engagement of the lower surface of bolt 24 against the inside surface of plate 12. When bolt 24 is moved to the unlocked position, a clearance slot 26 in plate 12 allows bolt 24 to pass through plate 12, thereby allowing the apparatus to be opened.

A lock cover assembly 27 comprising curved top cover 28 and end cover 29 is provided on base plate 12 to enclose bolt 24 and to prevent tampering with bolt 24 or with lock assembly 23.

For illustration, lock assembly 23 is shown as a Chicago Lock Company Model No. 3437. However, any comparable lock could be utilized in the FIG. 2 embodiment. By altering the location or shape of the bolt recess 25, any of several other lock arrangements could be used.

In operation, lock assembly 23 is unlocked and housing 9 is opened to allow substitute ball 17 to be inserted into ball socket 18 of hitch 10. Cover 11 is then moved to closure with base plate 12 and lock plate 13 is moved into overlapping contact with plate 12. Bolt 24 of lock assembly 23 is then rotated to the locked position, as shown in FIGS. 2–4.

A second embodiment of the invention having a single movable wall portion is shown in FIGS. 5–9. In the apparatus of FIG. 5, housing 9 comprises a housing cover 30 enclosed on the sides by side plates 31 and 32 and enclosed on the bottom by movable base plate 33 carying substitute ball 34. A hinged connection between cover 30 and plate 33 is provided by hinge pin sleeves 35 welded to cover 30 and a mating hinge pin 36 welded to base plate 33. A movable bolt lock assembly 37 having a projecting bolt 38 is provided to secure cover 30 to base plate 33, with a curved recess (not shown) being provided on side plate 32 to accept the outer end of bolt 38. Base plate 33 carries a lock enclosure in the form of an arched cover 39 enclosed by side cover 40.

The apparatus shown in FIG. 6 is similar to that shown in FIG. 5 and described above. In this arrangement, the side plates are affixed to base plate 33 and lock assembly 37 is carried on housing 30.

Figure 8:
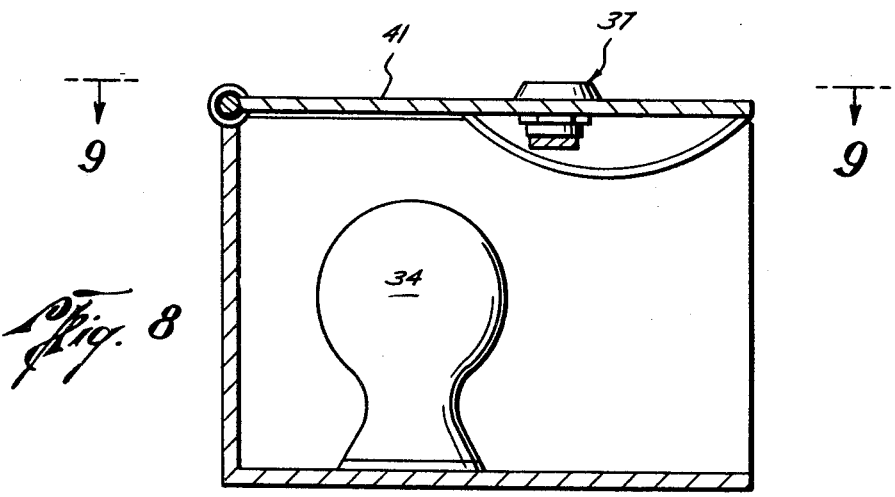
FIG. 8 is a sectional view of the second embodiment showing alternate hinge and lock locations.

FIGS. 7 and 8 illustrate other similar arrangements of a trailer hitch lock having a single movable wall portion, with a top cover 41 suitably hinged to the remainder of the housing.

Figure 9:
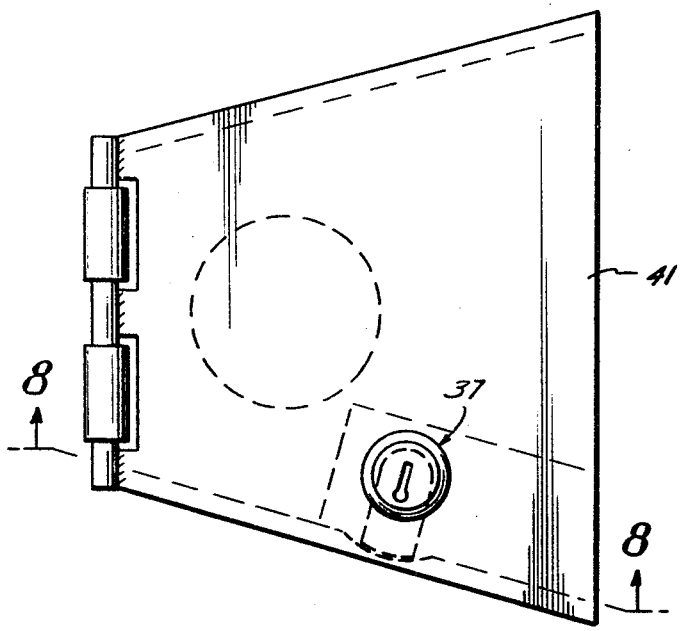
FIG. 9 is a plan view taken along 9—9 of FIG. 8.

A top view of the FIG. 8 embodiment is illustrated in FIG. 9 and is shown having a trapezoidally shaped top cover 41. This arrangement is suitable for use on trailer hitches of a corresponding trapezoidal shape and illustrates a typical modification suitable for use with all embodiments described above.

What is claimed is:
1. A trailer hitch locking device comprising:
housing arranged to enclose a ball socket and outer end portion of a trailer hitch, said housing having at least one pivoted movable wall section;
means carried by said housing for internally engaging the trailer hitch ball socket;
and, means for locking said movable wall section to selectively secure and remove said locking device from said trailer hitch.
2. The invention as claimed in claim 1 wherein said means for locking includes:
a lock assembly having a movable bolt thereon carried by one wall section of said housing means;
and, means for engaging said movable bolt carried on a second wall section of said housing means, one of said wall sections being said movable wall section.
3. The invention as claimed in claim 2 including:
means for enclosing said movable bolt to prevent access thereto, to said enclosing means being secured to at least one of the wall sections of said housing means.
4. The invention as claimed in claim 2 including:
means for pivotally securing said movable wall section to said housing.
5. The invention as claimed in claim 1 wherein:
said housing means has at least two movable wall sections.
6. The invention as claimed in claim 5 including:
means for pivotally securing said movable wall sections to said housing, said movable wall sections and said pivot means being arranged to allow at least partial overlaping contact between said movable wall sections when said locking device is secured about a trailer hitch.
7. The invention as claimed in claim 6 wherein said means for locking includes:
a lock assembly having a movable bolt thereon carried by one of said movable wall sections;
and, means for engaging said movable bolt carried by said housing means.
8. The invention as claimed in claim 7 including:
means for enclosing said movable bolt to prevent access thereto, said enclosing means being secured to at least one of the wall sections of said housing means.
9. The invention as claimed in clami 6 wherein said means for locking includes:
a lock assembly having a movable bolt thereon carried by said housing means;
and, means for engaging said movable bolt carried by one of said movable wall sections.
10. The invention as claimed in claim 9 including:
means for enclosing said movable bolt to prevent access thereto, said enclosing means being secured to at least one of the wall sections of said housing means.

References Cited
UNITED STATES PATENTS

| | | | |
|---|---|---|---|
| 2,571,349 | 10/1951 | Eckles | 70—14 |
| 3,237,969 | 3/1966 | Geress | 280—507 |
| 3,410,580 | 11/1968 | Longenecker | 280—507 |
| 3,826,110 | 9/1970 | Foote | 70—258 |

ROBERT L. WOLFE, Primary Examiner

U.S. Cl. X.R.

70—58; 280—507